(12) United States Patent
Turgay et al.

(10) Patent No.: US 6,428,442 B1
(45) Date of Patent: Aug. 6, 2002

(54) ELECTRIC MOTOR

(75) Inventors: Barlas Turgay, Filderstadt;
Martin-Peter Bolz, Oberstenfeld;
Juergen Glauning, Steinheim, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/529,212

(22) PCT Filed: Oct. 7, 1998

(86) PCT No.: PCT/DE98/02961

§ 371 (c)(1),
(2), (4) Date: Jun. 26, 2000

(87) PCT Pub. No.: WO99/18648

PCT Pub. Date: Apr. 15, 1999

(30) Foreign Application Priority Data

Oct. 7, 1997 (DE) .......................... 197 44 156
Mar. 12, 1998 (DE) .......................... 198 10 592

(51) Int. Cl.[7] .................................. F16H 3/44
(52) U.S. Cl. ................. 475/321; 475/149; 475/299; 74/7 E; 192/14
(58) Field of Search .................. 475/327, 321, 475/286, 320, 299, 149; 74/7 E; 192/14, 17 R (56) References Cited

U.S. PATENT DOCUMENTS

| | | | |
|---|---|---|---|
| 2,327,769 A | | 8/1943 | Claytor |
| 2,600,762 A | | 6/1952 | Hartz |
| 4,791,833 A | * | 12/1988 | Sakai et al. ............... 475/299 |
| 4,800,766 A | * | 1/1989 | Isozumi et al. ............. 74/7 E |
| 4,870,875 A | * | 10/1989 | Morishita .................. 475/153 |
| 4,892,013 A | * | 1/1990 | Satoh ....................... 475/299 X |
| 4,898,249 A | * | 2/1990 | Ohmori .................... 475/153 X |
| 5,418,400 A | | 5/1995 | Stockton |
| 5,685,796 A | * | 11/1997 | Chen et al. ................ 475/320 |

FOREIGN PATENT DOCUMENTS

| | | | | |
|---|---|---|---|---|
| DE | 89 14 904 U | | 2/1990 | |
| JP | 58-140468 | * | 8/1983 | ............... 74/7 E |

OTHER PUBLICATIONS

"Neues Starter–Generator–System", MTZ Motortechnishce Zeitschrift, vol. 58, No. 10, Oct. 1997, p. 630.

* cited by examiner

*Primary Examiner*—Charles A Marmor
*Assistant Examiner*—Ha Ho
(74) *Attorney, Agent, or Firm*—Michael J. Striker (57) ABSTRACT

The device according to the invention offers the advantage that by means of at least two drive positions and a neutral position of a planetary gear as a drive transmission for an electric machine, this electric machine can be used both as a starter for starting the internal combustion engine and as a generator for supplying power to an electrical system of the motor vehicle. The disposition of the electric machine connected in series with the planetary gear, for example in the drivetrain of the motor vehicle between a coupling and a manually shifted transmission preferably on a transmission input shaft, in particular has the advantage that the electric machine can remain in constant engagement without expensive devices for meshing and demeshing a conventional starter, and a control of the planetary gear based on fixed parameters can be carried out simply by means of the motor control.

19 Claims, 9 Drawing Sheets

ELECTRIC MOTOR

BACKGROUND OF THE INVENTION

The invention relates to an electric machine.

It is known that internal combustion engines in motor vehicles must be started by means of a starting device since they are not able to start by themselves. Normally, electrically operated starter motors are used for this purpose, which are connected to a voltage source via a starter relay embodied as a so-called solenoid switch. At the same time, in order to start, a pinion of the starter motor is brought into engagement with a ring gear that is usually connected to a flywheel of the internal combustion engine. Immediately after the internal combustion engine achieves sustained operation, the starter motor must be demeshed in order to prevent increased wear and powerful noise generation. If the starter must remain constantly engaged for particular reasons, then it must be designed for continuous running duty even at higher speeds.

It is likewise known that motor vehicles are equipped with a generator which on the one hand, supplies power to an electrical system of the motor vehicle and on the other hand, charges the voltage source that is required to additionally buffer the electrical system and to operate the starter motor. This generator, also referred to as a dynamo, is usually driven by a traction mechanism directly via the crankshaft of the internal combustion engine. The generator typically produces its nominal power at an average speed, but must be dimensioned so that it can also produce a sufficient electrical power even at the idling speed of the internal combustion engine in order to prevent a draining of the voltage source during long periods of idling. At the same time, however, it must be designed for the maximal speed of the internal combustion engine and thereby must be provided with sufficient cooling. The cooling at high speeds mostly takes place by means of air ventilation, which is encouraged by means of fan blades attached to it.

If an electric machine is intended to be operated alternately as both a starter and a generator, the first problem to arise is that of a speed-adapted design. During operation as a starter motor, a high starting moment and a relatively high power are required at a low speed. In order to reliably transmit such a high power, a coupling to a drivetrain of the internal combustion engine with a pair of gears is suitably selected, which is disengaged after the internal combustion engine starts. However, the generator must be in a position to assure a sufficient power output over a wide speed range and must achieve this without being at risk of overheating at the maximal speed. If the generator should be designed for a high electrical power output of the kind that is required for modern motor vehicles with a large number of electrical consumers such as servomotors, then conventional belt drives reach the limits of their performance capacity.

The prior patent application DE 197 192 13.0 describes an electric machine which can be coupled by means of a planetary gear with a transmission input shaft of a motor vehicle and which, with two different transmission stages, can be switched between operating as a starter motor for starting the internal combustion engine and operating as a generator for supplying energy to an electrical system of the motor vehicle. However, the disadvantage here lies in the provided switching via a linear adjustment path by means of a lever that must be mechanically connected and in the exclusively-axially acting friction surfaces for locking an internal gear of the planetary gear to its housing or planetary gear carrier. Because with small radiuses, the forces can be transmitted with a sufficient degree of reliability only with a high compressive force, this device requires a high actuation force on the lever and/or a voluminous construction of the planetary gear. In the above-described embodiment, it is also disadvantageous that a self-locking of the switching positions in the planetary gear is not provided. Consequently, the required high actuation forces for maintaining a desired switching position must be permanently exerted. Smaller electrically operated servomotors are thus not suitable for exerting the actuating forces. In lieu of this, for example hydraulic actuating drive mechanisms or mechanical actuating devices with sufficient leverages are necessary, which requires extra structural expenses.

SUMMARY OF THE INVENTION

The device according to the invention offers the advantage that by means of at least two drive positions and a neutral position of a planetary gear as a drive transmission for an electric machine, this electric machine can be used both as a starter for starting the internal combustion engine and as a generator for supplying power to an electrical system of the motor vehicle. The disposition of the electric machine connected in series with the planetary gear, for example in the drivetrain of the motor vehicle between a coupling and a manually shifted transmission preferably on a transmission input shaft, in particular has the advantage that the electric machine can remain in constant engagement without expensive devices for meshing and demeshing a conventional starter, and a control of the planetary gear based on fixed parameters can be carried out simply by means of the motor control.

By means of the neutral position that is provided in addition to the two drive positions, an imminent overloading of the electric machine can be prevented in an effective and simple fashion, if need be in an automated form, and in certain operating states, a reduction of the energy consumption of-the internal combustion engine can be achieved by simply breaking the operative connection. The switching of the planetary gear can take place in an effective fashion by means of a frictional fixing of an internal gear either in relation to a planetary gear carrier or in relation to a housing of the planetary gear, wherein this switching is produced by means of a mechanical switching means which can. be triggered in different ways, for example hydraulically or electromotively. Thus, a first end position can provide a locking of the internal gear in relation to the housing and a second end position can provide a locking of the internal gear in relation to the planetary gear carrier. In the neutral position, the internal gear can rotate freely, as a result of which an operative connection between the drivetrain of the motor vehicle and the electric machine is broken.

Advantageously, the two end positions or working positions of the planetary gear are geared differently. Thus, for example, this gearing can be i=5 in the first end position and i=2 in the second end position. As a result, when starting the internal combustion engine, a high moment can be transmitted at low speeds. During regular operation of the internal combustion engine, however, the electric machine operates at high speeds and can therefore supply a high initial electrical output. In addition, this permits a switching at a certain speed of the internal combustion engine, for example at 1500 RPM, which assures a sufficient electrical supply of electrical system, even in long periods of idling.

The mechanical switching of the planetary gear takes place suitably by means of an actuator which is coupled to the gearshift of the motor vehicle and can also be alternatively controlled as a function of different operating parameters. In order to achieve a compact structure and, with low actuation forces, to simultaneously achieve an effective locking of the internal gear either in relation to the housing or in relation to the planetary gear carrier, in a preferred embodiment, at least two brake shoes are provided, which encompass the internal gear radially from the outside at its greatest circumference. In this manner, high forces can be transmitted even with low actuation forces. The mechanical switching means can be electromagnetically, hydraulically, or pneumatically actuated—depending on the existing vehicle equipment.

Other advantageous embodiments of the invention ensue from the remaining features mentioned in the dependent claims.

BRIEF DESCRIPTION OF THE DRAWINGS

The invention will be explained in detail below in exemplary embodiments in conjunction with the accompanying drawings.

DESCRIPTION OF THE PREFERRED EMBODIMENTS

Figure 1:
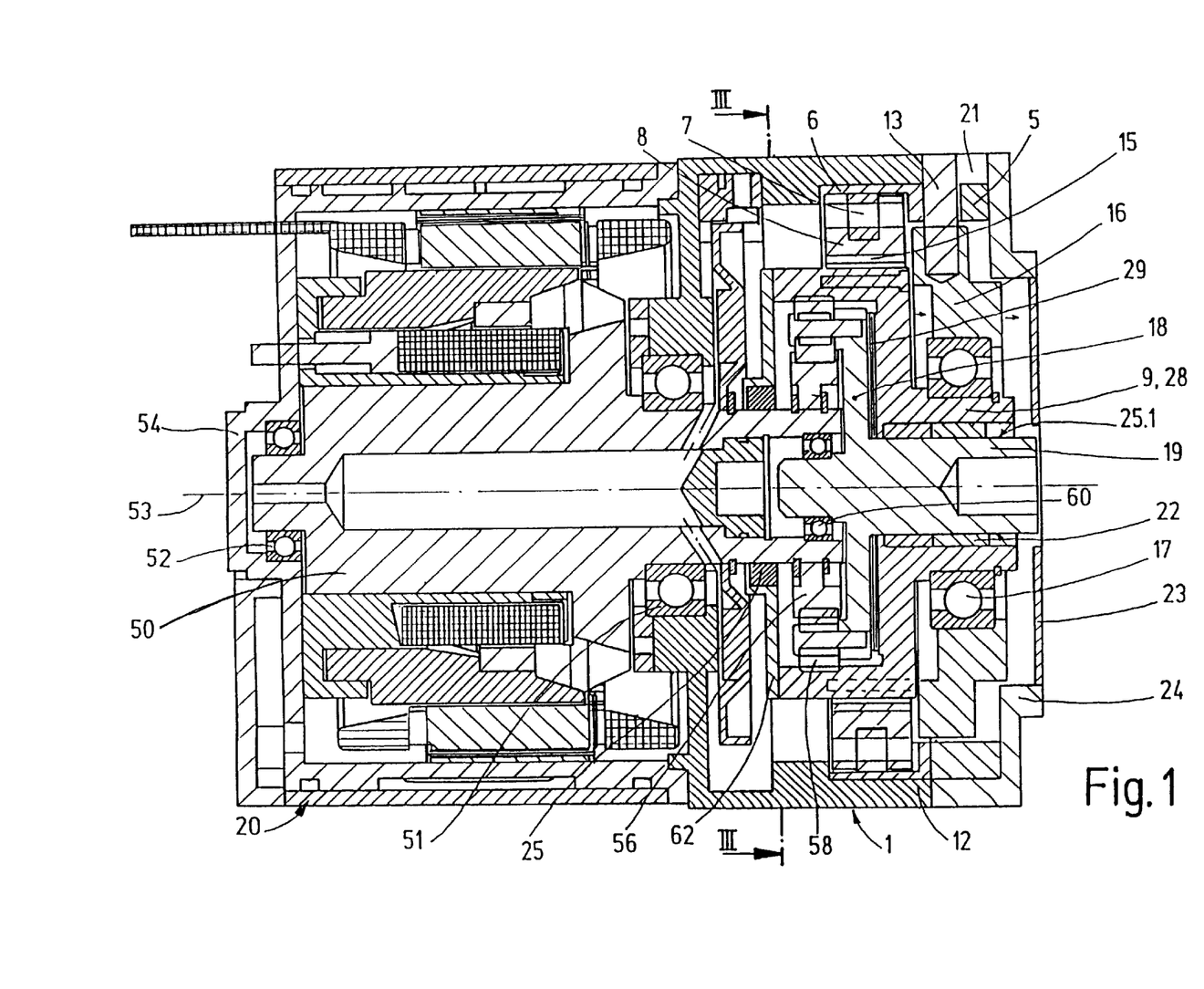
FIG. 1 is a sectional view of electric machine connected in series with a planetary gear.
Figure 2:
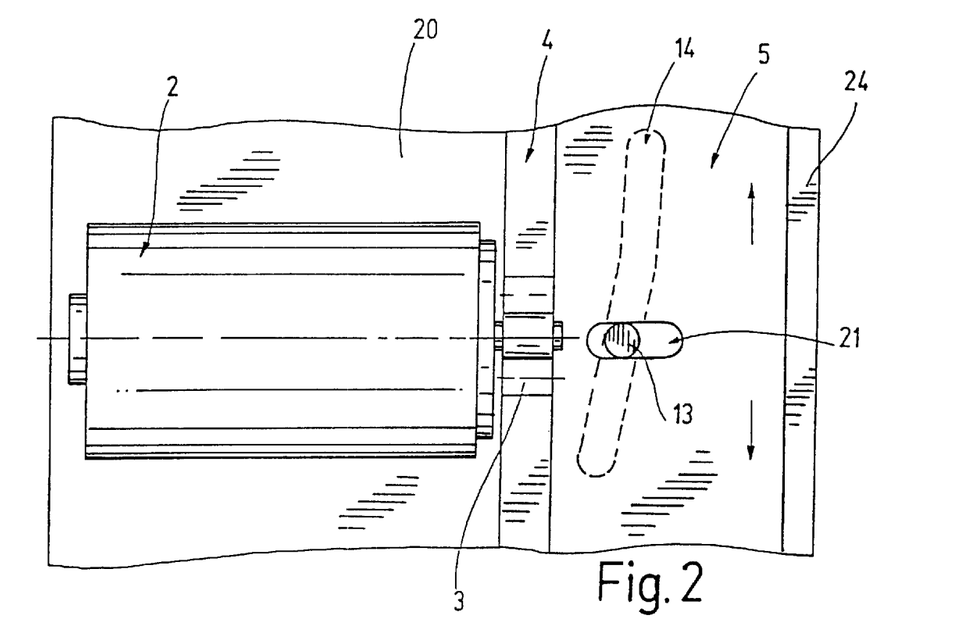
FIG. 2 is a schematic top view of the electric machine according to FIG. 1.

FIG. 1 shows a full sectional depiction and FIG. 2 shows a schematic top view of an electric machine 20, which is operatively connected to a planetary gear 1 and forms a structural unit with it. A rotor 50 of the electric machine 20 is supported in two roller bearings 51 and 52 in a housing 54. The roller bearings 51 and 52 in FIG. 1 are embodied by way of example as deep groove ball bearings. However, it is also possible to use tapered roller bearings, four-point ball bearings, or similar bearing designs. The smaller roller bearing 52 shown on the left in the exemplary embodiment depicted is supported with its outer ring in a seat of the housing 54, which is preferably embodied as cylindrical. The design of the electric machine 20 need not be discussed in detail here. For the current intended use, it is of primary importance that in addition to a generator operation mode, a motor operation mode is also possible. The electric machine 20 should be in a position to start an internal combustion engine of a motor vehicle and, when the internal combustion engine is running, should supply an electrical system of the vehicle as a generator. Therefore, the electric machine 20 must be able to supply a high starting torque when operating as a motor and must be as efficient as possible over wide speed ranges when operating as a generator.

At the end of the rotor 50 opposite from the shaft end that is supported in the roller bearing 52, this rotor is supported in a roller bearing 51 with heavier dimensions. At this end, the rotor 50 of the electric machine 20 is also provided with a gearing, which constitutes a central sun gear 56 of the planetary gear 1. The planetary gear 1 is connected to the electric machine 20, i.e. a housing 12 of the planetary gear 1 is screwed to and/or interlocked with the housing 54 of the electric machine 20. The rotor 50 with the sun gear 56 and all of the rotating parts of the planetary gear 1 described below, are disposed coaxial to a rotation axis 53. The sun gear 56 meshes with at least three or more planet gears, which will be referred to below as planets 58. The planets 58 are supported so that they can rotate freely,-cannot move axially, and are fastened to a planetary gear carrier 18. This planetary gear carrier 18 is in turn connected to a planetary gear. carrier shaft 19 or is embodied of one piece with this shaft, which in turn is operatively connected to a drivetrain of the motor vehicle. A preferred position for this operative connection, for example, is a transmission input shaft, i.e. in a drivetrain with a manual gear change box and manually actuated coupling,. between these two components.

The planetary gear carrier 18 is embodied as a short shaft wherein the shaft end disposed on the right in the exemplary embodiment shown is referred to as the planetary gear carrier shaft 19. The planetary gear carrier shaft 19 is supported by a needle bearing 22 in a shoulder 28 that is similar to a hollow shaft. The shoulder 28 is embodied as being of one piece with the internal gear 9 of the planetary gear 1. A seal 25.1, for example a shaft sealing ring, is inserted between the shoulder 28 and the planetary gear carrier shaft 19 and can be rotated in relation to it. The internal gear 9 can either rotate freely or, actuated by switching means, can be fixed either axially in relation to the planetary gear carrier 18 or radially in relation to a housing 12 of the planetary gear 1. These three possibilities for influencing the internal gear 9 in its relative rotational movement simultaneously define three possible switching positions of the planetary gear 1. In order to axially fix the internal gear 9 in relation to the planetary gear carrier 18, these parts each have a concentric contact surface disposed parallel to one another, wherein a break lining 29 is alternately provided on one of these two contact surfaces or on both of them.

By means of a bearing 17, which must be sufficiently dimensioned in order to be able to absorb axial and radial forces, the shoulder 28 of the internal. gear 9 is fixed in an inner race 16 so that the internal gear 9 and the inner race 16 can rotate freely in relation to each other, but are axially and radially fixed. The inner race 16 is provided with at least one pin 13 which protrudes radially outward and which can slide along exclusively in the axial direction in a lateral opening 21 in the housing 12. Consequently, the inner race 16 cannot rotate, but can be easily moved in the axial direction, supported in a sliding seat in an end plate 24 which, on its end face, is connected to the housing 12 and at the same time constitutes its cover.

An actuating ring 5 is also shown, which on its outer circumference, is guided in a sliding seat in the housing 12 and in the end plate 24 so that it can rotate and is axially fixed. An inclined plane 6 is provided on the inner circumference of the actuating ring 5, but its function is explained first in FIG. 3. A lever 7 is connected to a brake shoe 8, which can press radially against the outer circumference of the internal gear 9 depending on the position of the actuating ring 5. Furthermore, the pin 13 is guided through the actuating ring 5 in. a shifting guide path 14 for the pin 13, which path is not shown in detail here. In order to seal the electric machine 20 in relation to the planetary gear 1, which is preferably filled with lubricating oil, a first seal 25 is provided, which is inserted into a seat in a dividing wall 62 connected to the internal gear 9, between the sun gear 56 and the right bearing of the rotor 50, and is placed against a sealing surface of the rotor 50. This seal 25 can, for example, be embodied as a shaft sealing ring. In order to permit a perfect assembly, the rotor shaft is installed first, then the seal 25 is inserted, and only then is the sun gear 56 affixed to the rotor shaft. The second seal 25.1 seals the planetary gear carrier shaft 19, which functions as a driven shaft of the planetary gear 1, in relation to the outside and for this purpose, encompasses the front part of the planetary gear carrier shaft 19 and seals it in relation to the shoulder 28 of the internal gear 9.

FIG. 2 shows a gearing of a ring gear 4 which is attached to the actuating ring 5 and is operatively connected to a pinion 3 of an electric motor 2 disposed axially parallel to the electric machine 20. By means of a few pinion rotations of the electric motor 2, the actuating ring 5 can be rotated by a fixed angle, by means of which a transmission change of the planetary gear 1 can be produced. The top view according to FIG. 2 also shows the pin 13, which protrudes radially outward from the housing 12 through the lateral opening 21 and is guided in the oblique shifting guide path 14, shown here with dashed lines, in the actuating ring and permits the axial movement of the internal gear 9 in relation to the planetary gear carrier 18.

The pin 13 is fixed in the inner race 16. Because of the guidance of the lateral opening 21, which guidance only extends for a short distance in the axial direction, the pin 13 and therefore the inner race 16 cannot rotate in the circumference direction. A rotation in the circumference direction is only possible for the actuating ring 5, as long as the gearing of the ring gear 4 permits this. Since the shifting guide path 14, which extends along a path in the circumference direction for a distance that corresponds approximately to the length of the gearing of the ring gear 4, is inclined toward the electric machine 20 at one end, the end pointing downward in the depiction shown, the pin 13 and the inner race 16 connected to it are slid in the axial direction when the actuating ring 5 rotates.

On its outer circumference, the inner race 16 is guided in the end plate 24 connected to the end face of the housing 12 in such a way that this inner race can move axially without play and without tilting. On its inner circumference, the inner race 16 is connected to the internal gear 9 by means of the roller bearing 17, which absorbs axial and radial forces, and for this purpose, the internal gear has a shoulder 28, which is similar to a hollow shaft and has a smaller diameter than the internal gear 9 itself. By means of the inner race 16, which can be acted on with an axial force, and the roller bearing 17, which is fixed axially to the shoulder 28, the internal gear 9 can consequently be moved axially and as a result, can press against the end face of the planetary gear carrier 18, by means of which a reciprocal locking can be produced. A bearing suitable for the roller bearing 17 is, for example, a ball bearing, a tapered roller bearing, or a four-point ball bearing, which can transmit sufficient axial and radial forces. This operating position of the planetary gear 1 will be referred to below as position I.

Figure 3:
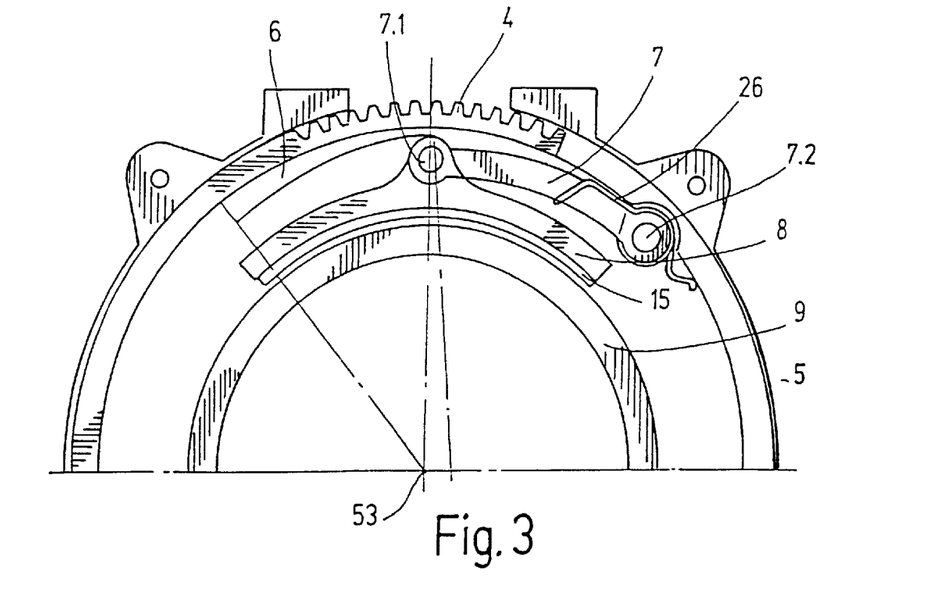
FIG. 3 is a partial front view of an actuating mechanism for switching the planetary gear.

FIG. 3 shows another function of the actuating ring 5 in a partial section III—III from FIG. 1. Parts which are the same as those in the preceding Figs. are provided with the same reference numerals and are not explained further. This top view shows the gearing 4 that is let into the -. circumference of the actuating ring 5 and makes it possible to rotate the actuating ring by a particular angle in its sliding seat in the housing 12. In the exemplary embodiment shown, this takes place by means of the electric motor 2, which acts as a servomotor and whose driven pinion 3 is operatively connected to the gearing 4.

On its inner circumference, the actuating ring 5 is provided with at least two inclined planes 6, each a section with a continually decreasing radius, which in a rotation of the actuating ring 5, presses toward the right against a head 7.1 of a lever 7 and pivots it inward, i.e. in the direction of the rotation axis 53, in a rotation point 7.2 fixed to the housing. In order to produce a tapering effect, the radius of the inclined plane 6 can taper more sharply at the beginning and less sharply at the end. In this manner, the beginning of the actuation path produces a greater stroke of the lever 7. Toward the end of the movement, the lever is only pressed against the internal gear 9 over a very short path, which results in a transmission of force. An arc-shaped brake shoe 8 is rotatably fastened to the head 7.1 of the lever 7 and is provided with a brake lining 15 on its inside. This inside follows the contour of the outer circumference of the internal gear 9 and can consequently brake it or completely lock it.

When the lever 7 is released, i.e. when the actuating ring 5 is rotated to the left, in order to prevent the brake shoe 8 from sliding uncontrollably against the internal gear 9 due to the force of gravity or due to changing acceleration forces, a spring 26 presses the lever 7 toward the inclined plane 6, i.e. away from the internal gear 9. The arc length of the inclined plane 6 suitably corresponds to the adjustment of the actuating ring 5, which is predetermined by the arc length of the gearing of the ring gear 4. Suitably, at least two symmetrically opposed inclined planes 6 having associated levers 7 with brake shoes 8 and a brake lining 15 are provided on the actuating ring 5. However, it is likewise possible for there also to be three or more corresponding locking devices spaced equidistantly apart from one another.

The function of the planetary gear 1 with its three possible switching positions I, II, III will be explained in detail in conjunction with the following FIGS. 4, 5, and 6. These FIGS. show an exemplary number of four planets 58. At least three planets 58 are required in order to assure a definite fixing of the planets 58, the internal gear 9, and the sun gear 56. Alternatively, more than three or four planets distributed as evenly is possible over the circumference can also be used, but increasing friction losses must be taken into account as a result of more gears being engaged with one another.

Figure 4:
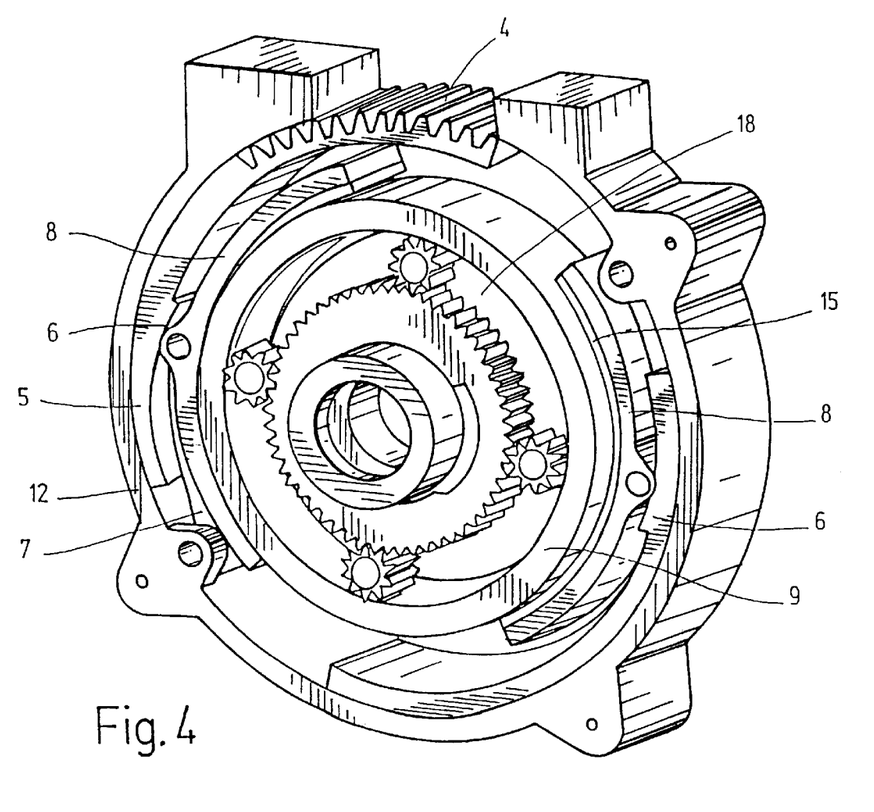
FIG. 4 is a partial perspective view of the planetary gear in a first position I.

FIG. 4 shows the planetary gear in a first switching position I. Here in the view shown, the actuating ring 5 is rotated toward the left, as a result of which the two inclined planes 6, which are disposed on the inner diameter of the actuating ring 5 and taper in the circumference direction, are rotated, and respectively press against the head 7.1 of the lever 7 and thereby press the brake shoes 8 with the brake linings 15 externally onto the internal gear 9 of the planetary gear 1. The internal gear 9 is thus locked and the speed of the rotor 50 is reduced to the speed of the planetary gear carrier shaft 19.

Figure 5:
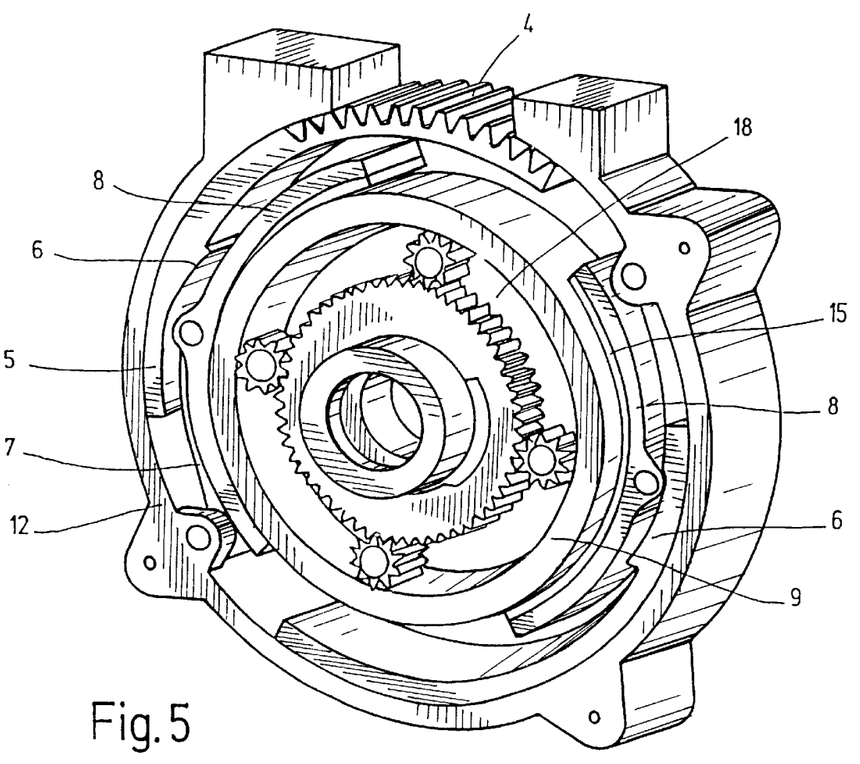
FIG. 5 is a partial perspective view of the planetary gear in a position III.

FIG. 5 shows the switching position III of the planetary gear 1. By rotating the adjustable ring 5 toward the right, the switching position I is canceled; at this point, the pins 13 are not moved in the radial direction. Since the pins are disposed at a point along their path of travel in which the pin travel path, which is disposed in the actuating ring 5 and is predetermined by the guide plane 14, only permits travel in the circumference direction, they spin in place. Since the two brake linings 15 are now released, the "neutral" position has been reached. Driven by the planets 58, the internal gear 9 can rotate freely since it is not fixed in relation to either the housing 12 or the planetary gear carrier 18. Consequently, no driving moment is acting on the rotor 50—it can coast freely.

Figure 6:
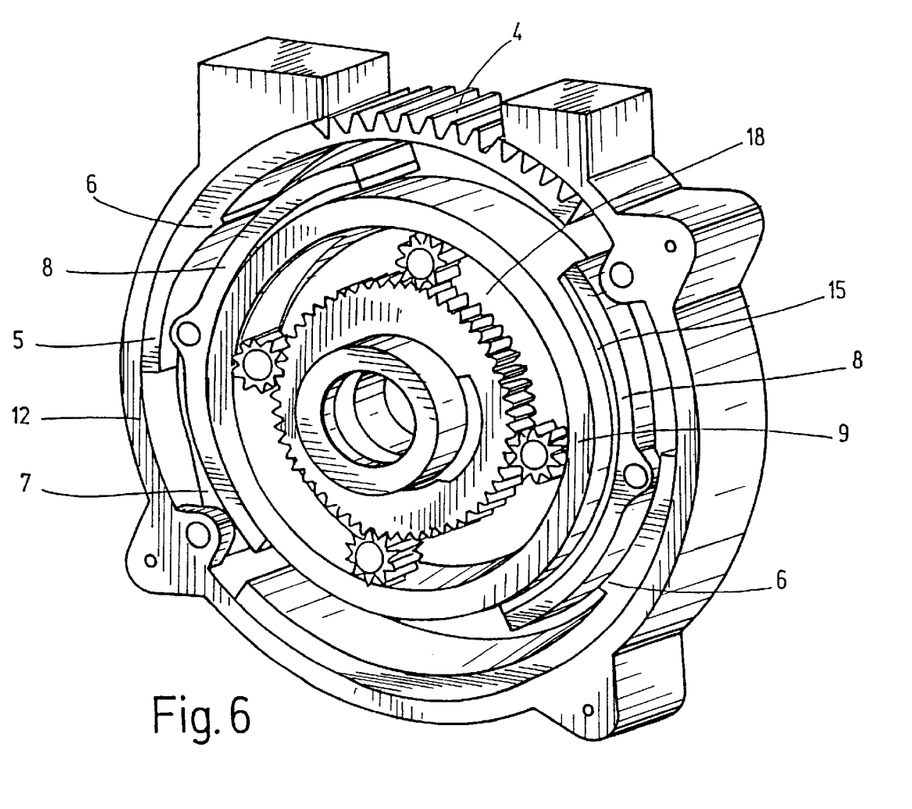
FIG. 6 is a partial perspective view of the planetary gear in a second position II.

FIG. 6 shows the planetary gear 1 in the other switching position II. Here, the actuating ring 5 is rotated completely toward the right as a result of which the pins 13 reach the point in their path of travel where the axial movement of the inner race 16 also begins. The movement of the pins 13 in the arc-shaped shifting guide path 14 in the actuating ring 5 continues, wherein a self-locking is also possible. This means that when the electric motor 2 is at rest, the respectively achieved switching position I, II, or III can also be maintained without additional holding forces. The internal gear is now moved by way of the roller bearing 17 in the direction of the planetary gear carrier 18 by means of the inner race that is guided with the pins 13 in the actuating ring 5. As a result, the inner race 16 is held with the planetary gear carrier shaft 19 by means of the brake lining 29 on the inner end face of the hollow chamber 9. As a result of being supported in the roller bearing 17, the inner race 16 can execute only axial movements. In this connection, the speed of the rotor 50 corresponds to the speed of the planetary gear carrier 50.

Figure 7:
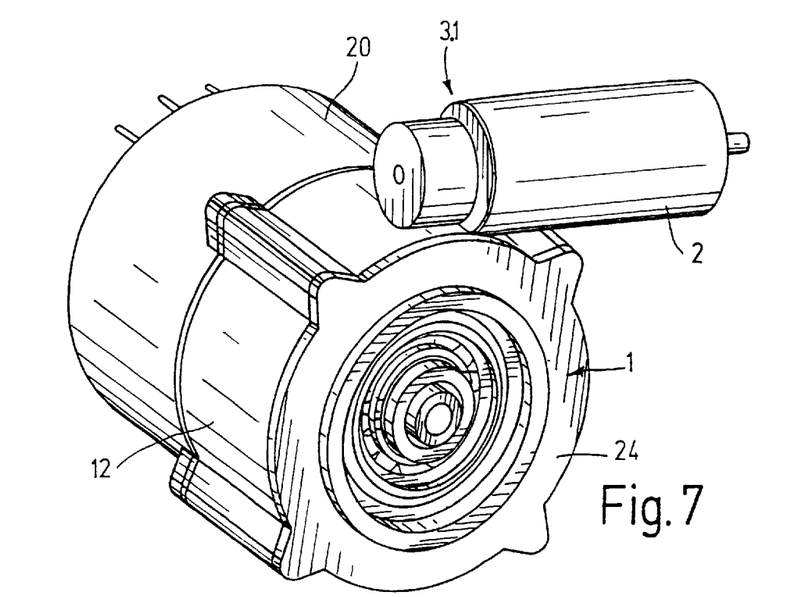
FIG. 7 is a schematic, perspective view of a variant of the electric machine.
Figure 8:
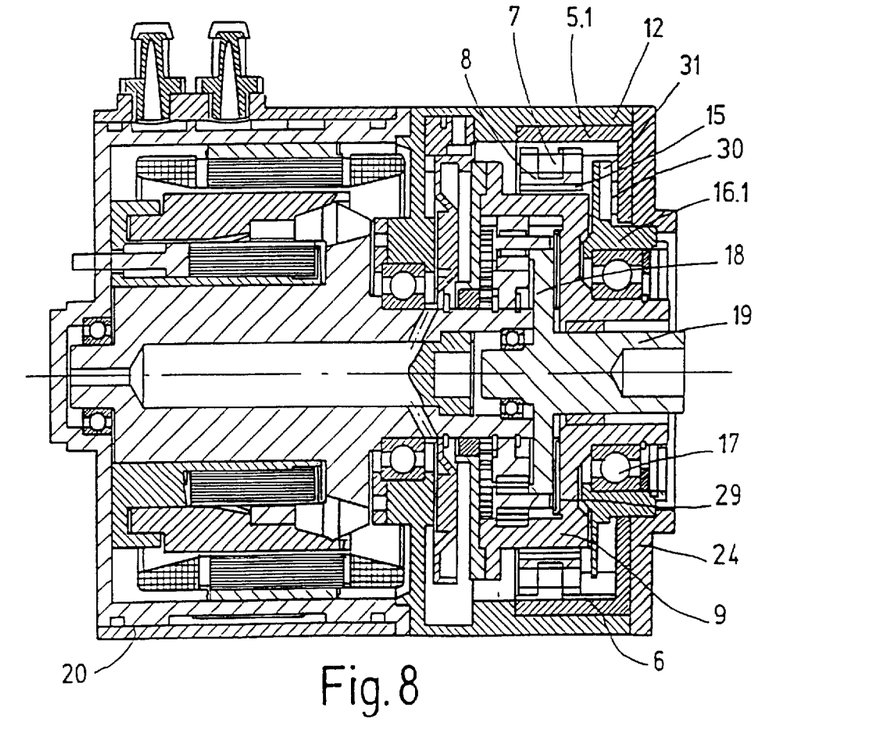
FIG. 8 is a sectional view of the electric machine according to FIG. 7.

In a schematic, perspective view (FIG. 7) and a complete section (FIG. 8), FIGS. 7 and 8 show a variant of the electric machine 2 with an operatively connected planetary gear 1. Parts which are the same as those in the preceding FIGS. are provided with the same reference numerals and are not explained further. Although it has essentially the same design as the embodiment described above, an essential difference is clearly visible, namely the differently embodied electric machine 2. In this embodiment, this electric machine 2, which functions as a servomotor for switching the planetary gear 1, is disposed with its rotation axis perpendicular to the rotation axis 53 of the planetary gear 1 and acts on a modified actuating ring 5.1 by means of a worm drive 3.1 instead of a pinion 3.

FIG. 8 shows a full sectional view of the electric machine 20 with an operatively connected planetary gear 1 according to FIG. 7. Since in this variant, essentially only the actuation of the actuating ring 5.1 and the axial introduction of force onto the internal gear 9 by means of a modified inner race 16.1 has been modified in comparison to the embodiment shown in FIG. 1 but the rest of the design remains virtually unchanged, only the modified parts and their function are discussed in detail below.

The adjustment of the planetary gear 1 takes place through an actuation of the electric motor 2, which can rotate the actuating ring 5.1 by way of its worm drive 3.1 which engages with the gearing 4. The radial locking of the internal gear 9 by means of the at least two brake shoes 8 that are connected to the actuating ring 5.1 functions in the same manner described above. The axial fixing of the planetary gear carrier 18 in relation to the internal gear 9, however, is modified in this variant since a pin guided in a shifting guide path is not provided here, but rather effective surfaces in the actuating ring 5.1 and the inner race 16.1, which surfaces correspond axially with one another. These effective surfaces are comprised of at least two axially disposed projections 30 in the actuating ring 5.1, which cooperate with at least two correspondingly fitting, axially disposed inclined planes 31 in the inner race 16.1 in such a way that when the actuating ring 5.1 rotates, the inner race 16.1 can undergo an axial movement of the internal gear 9 in relation to the planetary gear carrier 18. For this purpose, a direct axial contact of the inner race 16.1 against a corresponding surface of the internal gear 9 is provided so that in this embodiment, the roller bearing 17 only has to provide for the radial fixing and support of the inner race 16.1 in relation to the shoulder 28 of the internal gear 9. As described above in conjunction with FIG. 1, the shoulder 28 is supported on the planetary gear carrier shaft 19 by means of needle bearings 22.

Figures 9, 10A:
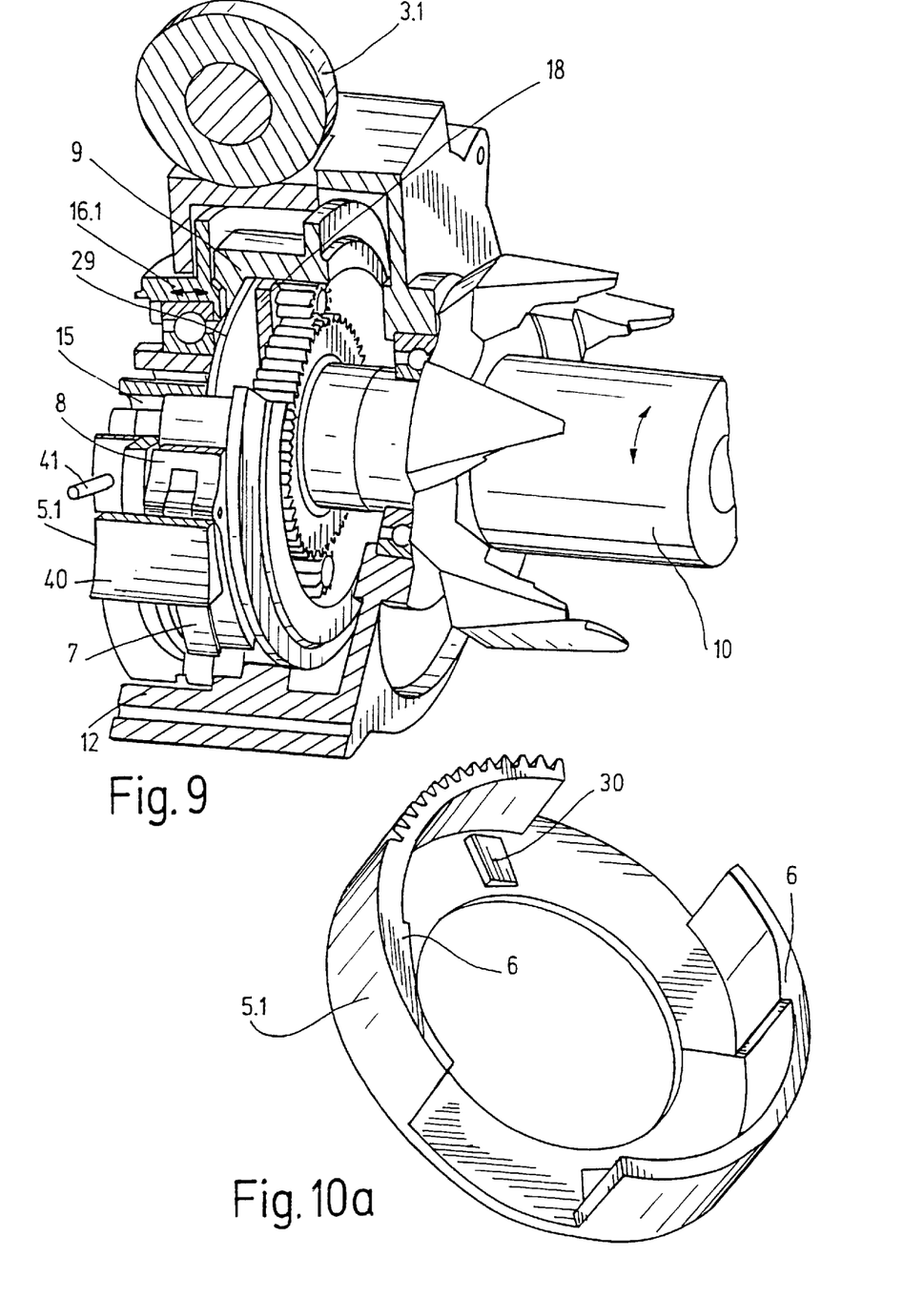
FIG. 9 is a perspective, partially sectional view of the electric machine with a planetary gear according to FIG. 8.
FIG. 10a is a perspective view of the actuating ring of the planetary gear.

FIG. 9 is a perspective, partially sectional view of the electric machine 20 with a planetary gear 1 according to FIG. 8. In addition to the components described above in conjunction with FIG. 8, in this case, one of at least two pins 41 can also be seen, which provide for an axially restricted guidance of the actuating ring 5.1 and thereby ensure that the internal gear 9 floats freely in the positions I and III and prevent it from sliding uncontrollably against the planetary gear carrier 18. When switching from the position II, the internal gear 9 initially remains stationary and does not follow the axial stroke of the inner race 16.1, as a result of which it can easily slide against the planetary gear carrier 18. In order to prevent this, at least two inclined planes 40, which correspond with the pins 41, are provided on the outer diameter of the actuating ring 5.1 in the axial direction and the pins 41 slide along these inclined planes and consequently pull the internal gear 9 away from the planetary gear carrier 18.

FIG. 10a is a perspective view of the actuating ring 5.1. Both of the radial inclined planes 6 and the at least two projections 30 that act in the axial direction on its circular, flat inside can be seen clearly here. For a symmetrical loading of the actuating ring 5.1, the projections 30 must be disposed as precisely opposite one another as possible, i.e. must be offset by an angle of 180°. However, it is just as possible for there to be three, four, or more projections 30, which should be distributed in a correspondingly uniform fashion over the circumference of the circle.

Figure 10B:
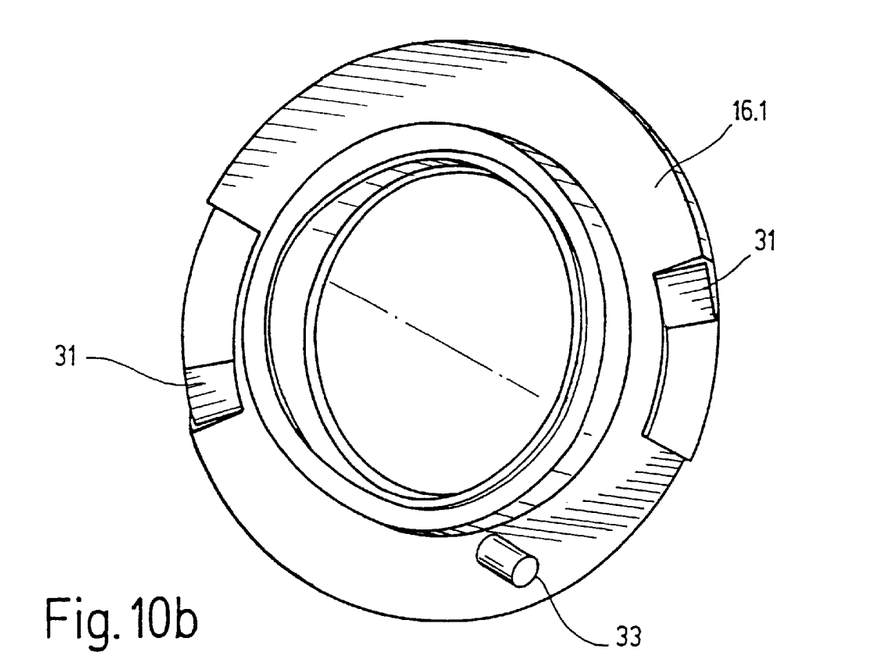
FIG. 10b is a perspective view of the inner race of the planetary gear.

FIG. 10b shows the modified inner race 16.1 with the inclined planes 31, which respectively correspond to the projections 30 in the actuating ring 5.1, as well as an adjusting spring 33 radially affixed to the outside or a pin. This pin or this adjusting spring 33 slide in a fitted guide in the housing 12 or in the end plate 24 and prevents the rotation of the inner race 16.1, which consequently can only be moved axially.

Figure 11:
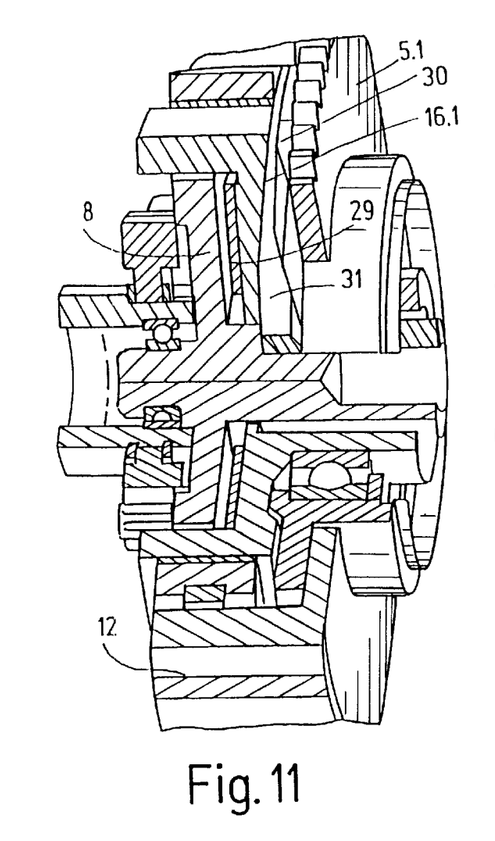
FIG. 11 is a perspective, partially sectional view of the planetary gear according to FIG. 9 in position I.

FIG. 11 shows a partially sectional view of the switching position I. The axially free-floating nature of the reciprocally mobile, axial coupling which is comprised of the planetary gear carrier 18 and the internal gear 9 with the brake lining 29 affixed to it are clearly visible here. This view also shows an inclined plane 31 attached to the round, flat side of the inner race 16.1 and which can be pressed against a corresponding projection 30 in the actuating ring 5.1 as soon as the actuating ring is rotated into a corresponding position.

Figure 12:
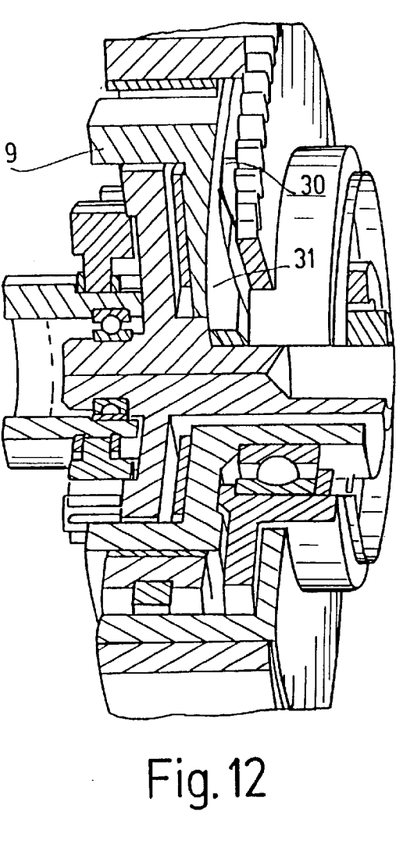
FIG. 12 is a perspective, partially sectional view of the planetary gear according to FIG. 11 in position III.

FIG. 12 is a perspective, partially sectional view of the neutral switching position III of the planetary gear 1.

Figure 13:
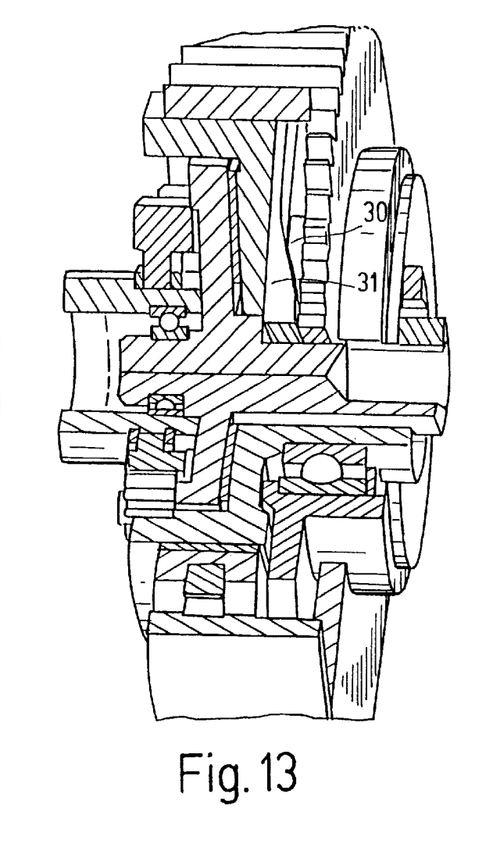
FIG. 13 is a perspective, partially sectional view of the planetary gear according to FIG. 11 in position II

FIG. 13 shows the switching position II of the planetary gear 1. The closed axial coupling is shown here.

Figure 14:
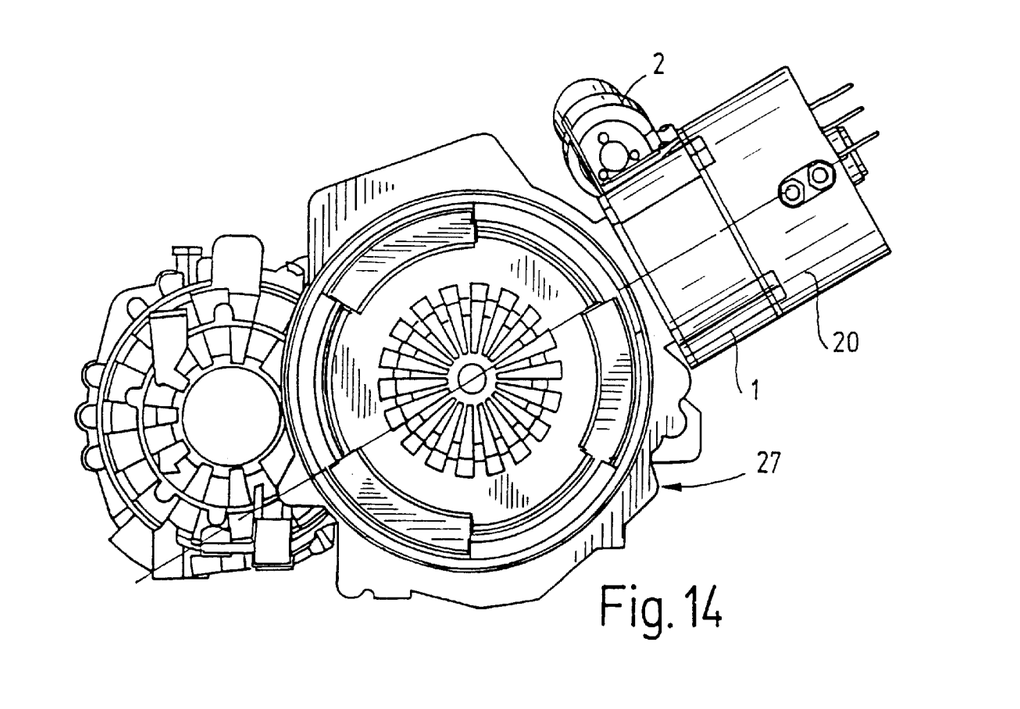
FIG. 14 is a schematic top view of the electric machine according to FIG. 7 when installed.

FIG. 14 is a schematic top view of the electric machine 20 according to FIG. 7 when installed. In this instance, the output, i.e. the planetary gear carrier shaft 19 of the planetary gear 1, is operatively connected to the drivetrain of the motor vehicle. In the embodiment shown, a manually shifted transmission 27 of the motor vehicle can be seen, whose input shaft is operatively connected to the planet gear carrier shaft 19 in a perpendicular fashion. For example, this can take place by means of a pair of mated bevel gears or an end gearing with a ring gear.

What is claimed is:

1. An electric machine for starting an internal combustion engine and for supplying voltage to an electrical system of a motor vehicle, wherein the electric machine is operatively connected to a planetary gear which can be used to couple the electric machine to the internal combustion engine and wherein by means of switching the planetary gear between an internal gear on the one hand, which is locked in relation to a housing of the planetary gear, and the internal gear on the other hand, which is locked in relation to a rotating planetary gear carrier, the electric machine can be switched between a motor operation and a generator operation, characterized in that a mechanical switching means disposed between a fixed housing part and the internal gear (9) can be moved in the circumference direction by means of a drive mechanism and in a first end position (I), locks the internal gear (9), and in a second end position (II), locks the internal gear (9) to the planetary gear carrier (18).

2. The electric machine according to claim 1, characterized in that in addition to the first and second end positions (I, II), the planetary gear (1) has a neutral position (III) in which the internal gear (9) and the planetary gear carrier (18) can rotate freely.

3. The electric machine according to claim 2, characterized in that the planetary gear (1) has a higher gearing in the first end position (I) than in the second end position (II).

4. The electric machine according to claim 3, characterized in that the gearing in the first end position (I) is preferably i=5:1.

5. The electric machine according to claim 4, characterized in that the gearing in the second end position (II) is preferably i=2:1.

6. The electric machine according to claim 5, characterized in that the planetary gear (1) can be mechanically switched by means of the drive mechanism.

7. The electric machine according to claim 6, characterized in that the planetary gear (1) can be actuated by means of a mechanical switching means that can be externally actuated and is coupled by means of an actuator of a manually shifted transmission (27).

8. The electric machine according to claim 7, characterized in that the mechanical switching means for switching the planetary gear (1) is an actuating ring (5, 5.1).

9. The electric machine according to claim 8, characterized in that the actuating ring (5, 5.1) has a section with a gearing (4), which is operatively connected with a rotatable pinion (3) or a worm drive (3.1).

10. The electric machine according to claim 1, characterized in that in the first end position (I), the internal gear (9) can be locked by means of frictional force.

11. The electric machine according to claim 1, characterized in that in the second end position (II), the internal gear (9) can be locked to the planetary gear carrier (18) by means of frictional force.

12. The electric machine according to claim 11, characterized in that the transmission gears (9, 56, 58) of the planetary gear (1) engage in one another permanently.

13. The electric machine according to claim 12, characterized in that a brake lining (29) is provided in the planetary gear (1) for the frictionally engaging connection of the internal gear (9) and the planetary gear carrier (18).

14. The electric machine according to claim 13, characterized in that an actuating ring (5, 5.1), with an inside in the circumference direction, has at least one inwardly directed, inclined plane (6), by means of which a brake shoe (8) is supported and can be pressed radially inward against the outer circumference of the internal gear (9).

15. The electric machine according to claim 14, characterized in that the brake shoe (8) is supported by means of a lever (7).

16. The electrical machine according to claim 8, characterized in that the actuating ring (5) has a shifting guide path (14) in the circumference direction, with an axial inclination at one end, into which a pin (13) protrudes, which is disposed on an inner race (16) and projects radially outward, wherein the pin (13) can move a non-rotatable inner race (16) axially via the shifting guide path (14) and can press the internal gear (9) against the end face of the planetary gear carrier (18) by means of a roller bearing (17).

17. The electric machine according to claim 8, characterized in that the actuating ring (5) has at least one other projection (30) rising in the axial direction, which cooperates with another inclined plane (31) rising in the axial direction on an inner race (16) in such a way that it can press the internal gear (9) axially against the end face of the planetary gear carrier (18) when the actuating ring (5) is moved into the second end position(II).

18. The electric machine according to claim 1, characterized in that the electric machine (20) can be coupled to a drivetrain of the internal combustion engine by means of the planetary gear (1) in such a way that in order to synchronize a manually shifted transmission (27), the gearing stages in the planetary gear (1) and therefore a mass moment of inertia of the electric machine (20) can be selected in accordance with a desired speed adaptation of the drivetrain.

19. The electric machine according to claim 1, characterized in that the mechanical switching means can be mechanically, electromagnetically, hydraulically, and/or pneumatically actuated.

* * * * *